United States Patent
Murali et al.

(10) Patent No.: US 7,066,657 B2
(45) Date of Patent: Jun. 27, 2006

(54) OPTICAL SUBASSEMBLY

(75) Inventors: Venkatesan Murali, San Jose, CA (US); Douglas E. Crafts, San Jose, CA (US); Suresh Ramalingam, Fremont, CA (US); Brett M. Zaborsky, San Jose, CA (US); Siegfried B. Fleischer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 09/752,881

(22) Filed: Dec. 28, 2000

(65) Prior Publication Data

US 2005/0117853 A1 Jun. 2, 2005

(51) Int. Cl.
*G02B 6/42* (2006.01)
*G02B 6/30* (2006.01)

(52) U.S. Cl. ............................... 385/92; 385/49
(58) Field of Classification Search ............... 385/49, 385/88–94
See application file for complete search history.

(56) References Cited

U.S. PATENT DOCUMENTS

| | | | |
|---|---|---|---|
| 5,168,537 A | * | 12/1992 | Rajasekharan et al. ....... 385/89 |
| 6,040,934 A | * | 3/2000 | Ogusu et al. ............... 398/139 |
| 6,148,016 A | | 11/2000 | Hegblom et al. |
| 6,454,470 B1 | * | 9/2002 | Dwarkin et al. ............... 385/93 |
| 6,501,876 B1 | * | 12/2002 | Okada et al. ................. 385/31 |
| 6,636,663 B1 | * | 10/2003 | Lindsey ....................... 385/33 |
| 2001/0048793 A1 | * | 12/2001 | Dair et al. .................... 385/92 |

FOREIGN PATENT DOCUMENTS

| | | | | |
|---|---|---|---|---|
| EP | 14510 A1 | * | 8/1980 |
| JP | 58202423 A | * | 11/1983 |
| JP | 60008806 A | * | 1/1985 |
| JP | 61144542 A | * | 7/1986 |
| JP | 03092804 A | * | 4/1991 |
| JP | 03144602 A | * | 6/1991 |

* cited by examiner

*Primary Examiner*—John D. Lee
(74) *Attorney, Agent, or Firm*—Blakely, Sokoloff, Taylor & Zafman LLP

(57) ABSTRACT

An apparatus including a base having a first opening of a dimension suitable to pass a light emission therethrough, a first side wall coupled to the base and having a second opening of a dimension suitable to pass a light emission therethrough, a second side wall coupled to the base and having a reflective component thereon, and the base, the first side wall, and the second side wall define an interior chamber with the reflective component disposed in the interior chamber; and a fiber connector extending from an exterior of the first side wall adjacent the second opening. A method including powering a laser disposed in a substrate coupling a fiber optic cable to an optical subassembly; and aligning the optical assembly over the transceiver board to capture the emitted light from the laser in the fiber optic cable.

6 Claims, 3 Drawing Sheets

OPTICAL SUBASSEMBLY

BACKGROUND OF THE INVENTION

1. Field of the Invention

The invention relates to optical circuits and more particularly to optical transceivers.

2. Description of Related Art

Optical circuits offer advantages over traditional electrical circuits, particularly, in their perceived ability to provide higher speed data transmissions. Such transmissions may take place not only between computers, but also within machines, in which case board-to-board and chip-to-chip data communication using optical circuits can be utilized.

Semiconductor lasers typically come in two forms. A well known form is an "in-plane" laser, where the light inside the laser travels parallel to the substrate, such as a semiconductor substrate. More recently, a different laser geometry has developed, particularly for short distances (less than 100 meters) data communications, such as between computers. These lasers are typically known as "vertical cavity surface emitting lasers" (VCSELs). A VCSEL emits light perpendicular to the substrate as the name implies. One advantage of VCSELs are that they are capable of being modulated at high speeds with much lower electrical power than in-plane lasers. In addition, the geometry of VCSELs makes them particularly suitable for making two dimensional arrays. A third advantage is the ability to test VCSELs for fitness at the wafer level.

As noted, VCSELs emit light outward or away from a surface of the device or substrate (e.g., perpendicular to the device or substrate). One challenge to manufacturers of optical circuits such as transceivers that both transmit and receive signals and therefore may comprise VCSELs is the ability to bend or fold the light from a generally perpendicular or orthogonal transmission to a transmission lateral to the substrate and couplable to a fiber connection. At frequencies of 2.5 gigabits per second, current transceivers are able to manage such folding or bending of the light. As circuits move from 2.5 to 10 gigabits per second, the concern of managing these high frequency signals, particularly concerns of cross talk, signal delays, and signal losses, increases.

What is needed is a device for bending or folding light from a VCSELs into a fiber connection such that signal propagation may be made in a single plane.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

An apparatus is disclosed. In one embodiment, the apparatus is suitable as a subassembly of a transmitter, receiver, or transceiver of optical signals, particularly optical signals generated by semiconductor lasers such as VCSELs. In this regard, a system is also disclosed incorporating an apparatus as an optical subassembly of an optical circuit assembly. The optical assembly may be used to fold or bend emitted light from a VCSEL of a transceiver or a fiber to a photodetector to allow signal propagation in a desired plane. In this regard, the apparatus may be configured according to a desired formfactor for use within standard optical circuit (e.g., transceiver) packages. A technique for aligning a fiber to an optical circuit assembly is also disclosed.

Figure 1:
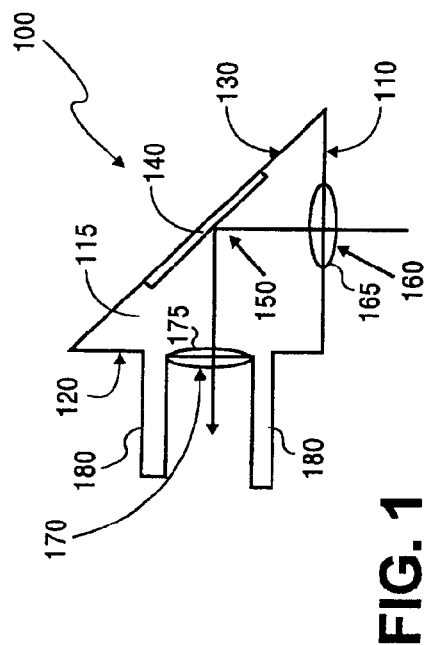
FIG. 1 shows a cross-section of an embodiment of a subassembly according to an embodiment of the invention.

FIG. 1 shows a cross-section of an embodiment of an apparatus that is suitable as a subassembly component for folding a light emission, such as a light emission from an optical transceiver. FIG. 1 shows subassembly 100 including base 110, first side wall 120, and second side wall 130. Base 110 includes opening 160 of a dimension suitable to pass a light emission therethrough. In the context of optical transceivers, opening 160 is suitable for passing a light emission from a VCSEL or other semiconductor laser therethrough.

First side wall 120 includes opening 170 similarly suited to pass a light emission, such as a light emission from a semiconductor laser therethrough.

In this embodiment, the first side wall 120 is arranged approximately perpendicularly to base 110 and second side wall 130 is disposed at an angle relative to the plane of base 110 and is coupled between base 110 and first side wall 120. In one embodiment, base 110, first side wall 120, and second side wall 130 form a unitary body defining interior chamber 115. Subassembly 100 is a polygon body of triangular and tetrahedral facets. In one embodiment, subassembly 100 is formed of a plastic material, such as a molded plastic material.

Second side wall 130, in this embodiment, includes reflective component 140. Reflective component 140 is, for example, a mirror coupled to second side wall 130 and disposed within interior chamber 115. Alternatively, second side wall 130 comprises a mirrored surface over a portion of its area within interior chamber 115.

In the embodiment shown in FIG. 1, opening 160 about base 110 includes converging lens 165. Similarly, in this embodiment, first side wall 120 includes converging lens 175 about opening 170. Taken with reflective component 140, converging lenses 165 and 175 focus a light emission through subassembly 100. For a light emission through base 110, converging lens 165 directs light to principal focus 150 by converging the light emissions at that principal focus. Converging lens 175 may be used to converge a reflected emission (reflected off second side wall 130 into an optical fiber, such as an 8 to 10 micron optical fiber). It is appreciated that a light transmission from the opposite direction (i.e., from an optical fiber) will similarly be converged by converging lens 165 and 175 into, for example, a light receiving device on a substrate.

Referring to FIG. 1, subassembly 100 includes connector 180 coupled to first side wall 120 about opening 170. Connector 180 is suitable, in one embodiment, to accommodate a single optical fiber. For example, connector 180 may be cylindrically disposed about opening 170 and have a diameter equivalent to the diameter of a ferrule of an optical fiber. Representative dimensions for a suitable optical fiber for gigabit data transfers (e.g., 2.5–10 gigabits/second) has a ferrule diameter on the order of 62.5 microns surrounding a fiber on the order of 8 to 10 microns.

Accordingly, connector 180 is, for example, a cylindrically disposed plastic connector within an opening diameter on the order of 62.5 microns. In this regard, connector 180 is a compression fit connector to maintain the coupling or attachment of an optical fiber to subassembly 100.

Figure 2:
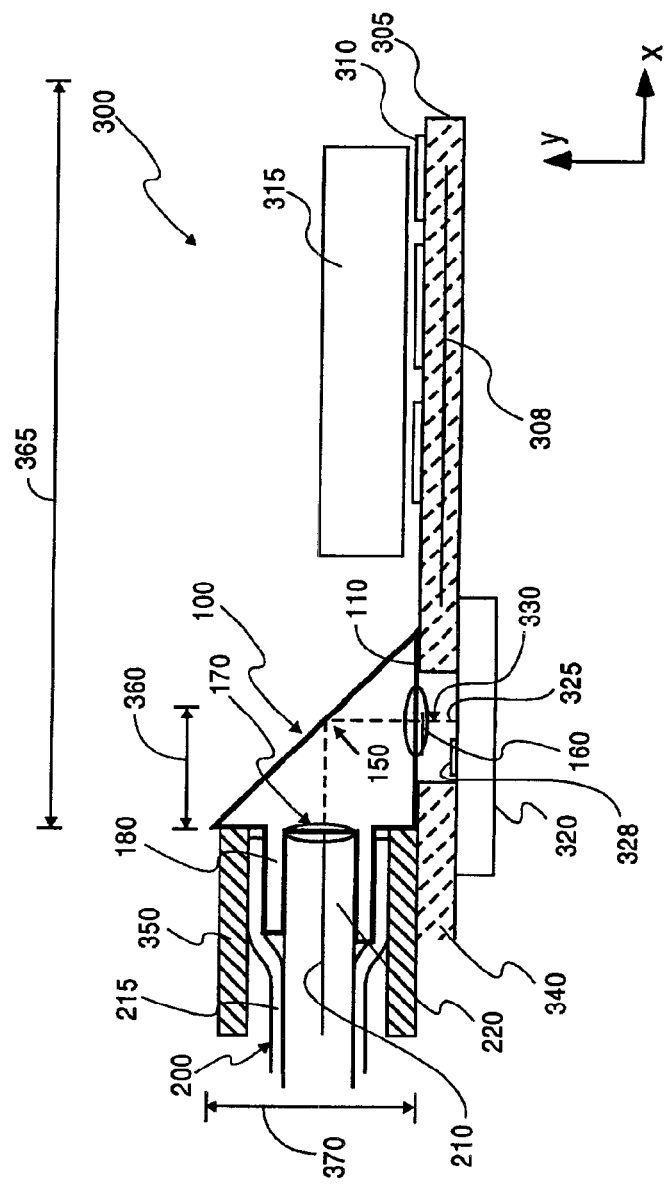
FIG. 2 shows a cross-section of an embodiment of a transceiver coupled to a fiber in accordance with an embodiment of the invention.

FIG. 2 shows a cross-sectional side view of a transceiver that is used, in one example, for high speed (e.g., gigabits/second) data transmissions. Certain features illustrated in the figure are shown exaggerated or not to scale in an effort to highlight the description of the invention contained herein. Transceiver assembly 300 includes, in this embodiment, transceiver board 305 of, for example, a ceramic or laminate material having signal lines 308 disposed therein. Coupled to transceiver board 305 are a plurality of devices or chips 310, typically low frequency transmitter, receiver, and, driver circuits. Overlying devices or chips 310 of transceiver assembly 300 is heat sink 315.

Referring to FIG. 2, coupled to a base of transceiver board 305, is VCSEL submount 320. VCSEL submount 320 includes VCSEL 325 and assorted circuitry for communicating with transceiver board 305 and devices or chips. VCSEL submount 320 also includes, for a complete data link, a photodetector or photodetectors 328. VCSEL submount 320 typically further includes input/output circuitry for receiving and transmitting signals. Amplifiers and signal cleanup circuitry may also be included. The various circuitry may take the form a multi-chip module (MCM).

VCSEL submount 320 is mounted, in one embodiment, between transceiver board 305 and fiber submount 340. Fiber submount 340 is, for example, a board substrate, such as a laminate, ceramic, or fiberglass board. By coupling between transceiver board 305 and fiber submount 340, an opening is created by which light emissions may be transmitted and received at a surface of VCSEL submount 320. It is appreciated that an array of VCSEL submounts may be coupled in this manner, such as aligned along a Z axis in the plane of the paper containing FIG. 3.

Coupled at its base (base 110) to transceiver board 305 and fiber submount 340 is subassembly 100. In this embodiment, subassembly 100 is disposed between transceiver board 305 and fiber submount 340, such that an opening (or openings) in base 110 of subassembly 100 overly the opening between transceiver board 305 and fiber submount 340. Specifically, opening 160 overlies an emission path from VCSEL 325 allowing a light emission into subassembly 100. It is appreciated, although not shown in this illustration that a second opening (disposed along a Z axis into the plane of the page) is similarly situated to allow VCSEL submount 320 to receive signals (e.g., receive signals at photodetector 328) to complete a data link.

In the embodiment shown in FIG. 2, fiber 200 is coupled to subassembly 100 through connector 180 and is "force-fit" against first side wall 120. Specifically, ferrule 220 of fiber cable 200 is disposed within connector 180 with buffer coating 215 of fiber cable 200 displaced away and outside connector 180. In one embodiment, connector 180 is suitable for accommodating an LC connector developed by Lucent Technologies (an interconnector based upon on RJ-45 interface). Alternatively, connector 180 may accommodate an MT-RJ connector developed by a consortium of AMP (Tyco Electronics Corporation), Seicor Industries, Inc., Fujikura America, Inc., and USConec, Ltd. For an LC connector adoption as shown, connector interface assembly 350 is adapted to receive an LC connector and accommodated with the dimensions of first side wall 120 of subassembly 100. Connector interface assembly 350 is coupled by, for example, adhesive to subassembly 100.

In the embodiment shown in FIG. 2, subassembly 100 is designed to compliment a state-of-the-art formfactor for transceiver boards. Specifically, a state-of-the-art transceiver assembly (transceiver assembly 300) has a length in the X-direction on the order of 30 to 50 millimeters (denoted by reference numeral 365). The transceiver assembly has a height on the order of 8 to 10 millimeters (denoted by reference numeral 370). Given these constraints, it is also desired for high speed data transmissions that the distance between an emitter surface, such as a surface of VCSEL subassembly, and fiber core 210 is on the order of 3 to 4 millimeters (e.g., 3.4 millimeters). Subassembly 100 accommodates the formfactor limitations through the use of angled second side wall 130 having reflective component 140. In this manner, subassembly 100 redirects (in the orientation shown) a vertical (Y-direction) light emission to a lateral light emission or vice versa through angled second side wall 130.

A typical state-of-the-art VCSEL (VCSEL 325) may emit light having a spot size on the order of 30 to 40 microns. By using converging lens 160, this spot size may be reduced to a spot size on the order of 8 to 20 microns suitable for alignment with fiber core 210 of optical fiber 200.

In the embodiment illustrated in FIG. 2, subassembly 100 may be mounted to transceiver board 305 and fiber submount 340 through the use of an epoxy, such as a board grade epoxy as known in the art. Such mounting or coupling is done, in one embodiment, after the alignment of the optical signal between the VCSEL (and such photodetector) and the fiber.

Figure 3:
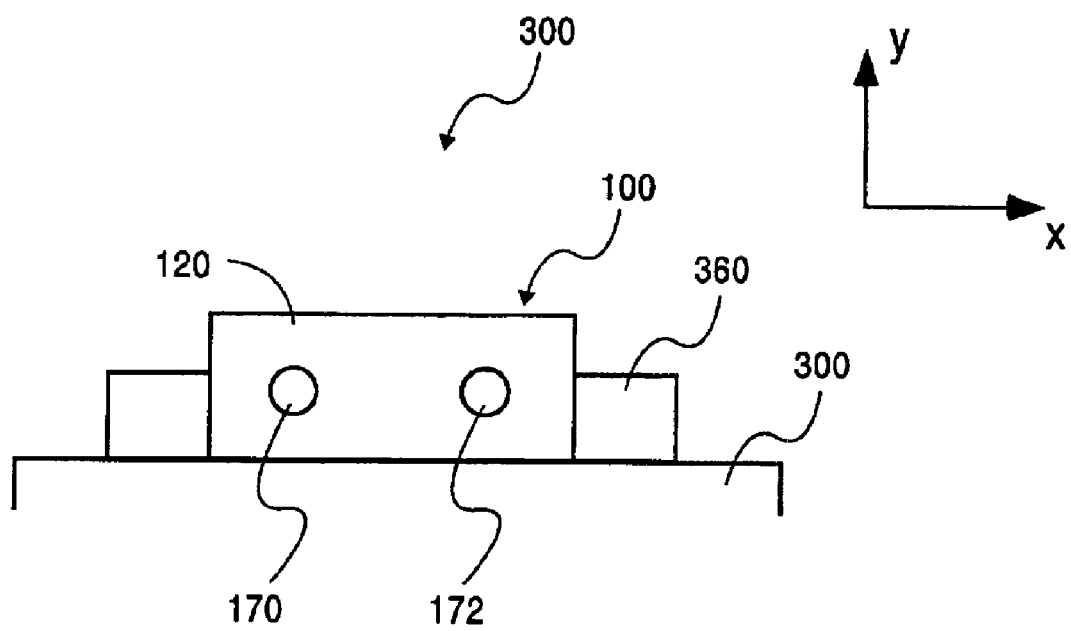
FIG. 3 shows a cross-section of a portion of the transceiver of FIG. 2.

FIG. 3 shows a cross-section of a portion of transceiver assembly 300 in a YZ plane and demonstrates further aspects of mounting subassembly 100 to transceiver board 305. In this embodiment, subassembly 100 is shown having two openings (opening 170 and 172) therein to, for example, send and receive light transmissions, respectively. FIG. 3 also shows subassembly 100 mounted to transceiver board 300 through buttress connectors 360. Buttress connectors 360 are, for example, a durable plastic material coupled to transceiver board 300 with an epoxy.

One difficulty in manufacturing transceiver assembly such as transceiver assembly shown in FIGS. 2 and 3 is the alignment of optical signals between VCSEL submount 320 and one optical fiber (e.g., optical fiber 200). Whether the optical fiber is a single mode fiber or an optical mode fiber, the manufacturer seeks to match the mode of the emission, for example, an emission from VCSEL 325 within a half (½) of a micron of the optical center of fiber core 210. One way this may be accomplished is illustrated in the block diagram of FIG. 4.

Figure 4:
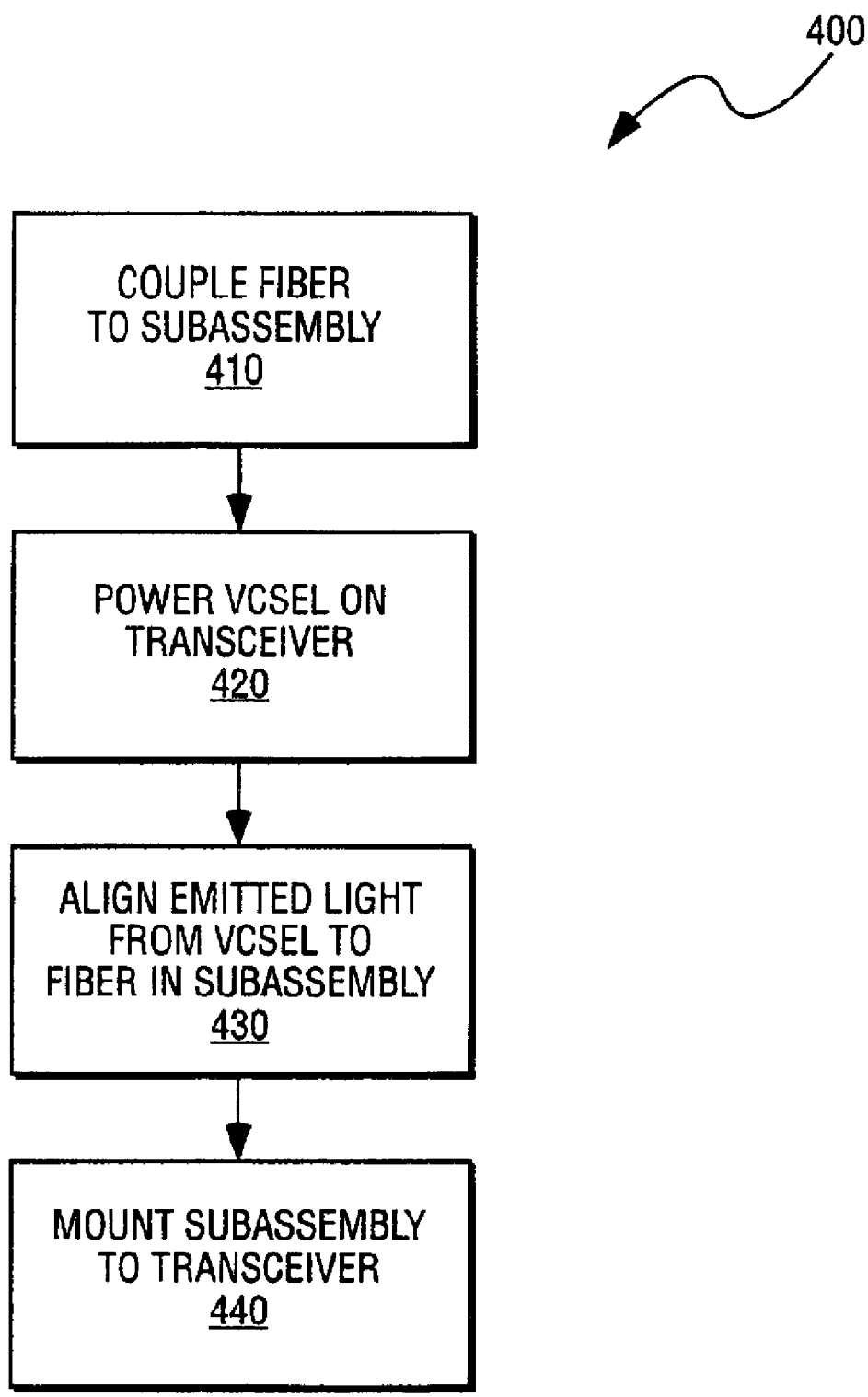
FIG. 4 shows a block diagram of a technique for aligning a fiber with a semiconductor laser according to an embodiment of the invention.

Referring to FIG. 4, alignment issues of transceiver assembly 300 are addressed in the following manner. Prior to coupling the subassembly to transceiver board 305, an optical fiber is coupled to the subassembly (block 410). The transceiver is then powered so that light transmissions are emitted from the VCSEL (block 420). With light transmissions emitted from the VCSEL, the emitted light from the VCSEL is aligned to the fiber in the subassembly (e.g., within one-half micron of the optical center of the fiber). (block 430). The subassembly is then mounted to the transceiver board such as by, for example, an epoxy (block 440).

The preceding description detailed an apparatus suitable, in one embodiment, for use in a circuit assembly for bending light from a semiconductor laser has been described as has a method of assembling an optical circuit assembly to align an optical emission with electronic circuitry. The optical subassembly describes a suitable structure for maintaining the desired formfactor constraints of state-of-the-art circuit assemblies, including path links of light emissions from semiconductor lasers. The optical subassembly may be aligned with desired assembly circuitry to capture a light emission with minimal loss between a fiber and the circuitry.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a base having a first opening of a dimension suitable to pass a light emission therethrough;
   a first side wall coupled to the base and having a second opening of a dimension suitable to pass a light emission therethrough;
   a second side wall coupled to the base and having a reflective component thereon, and the base, the first side wall, and the second side wall define an interior chamber with the reflective component disposed in the interior chamber; and
   a fiber connector extending from an exterior of the first side wall adjacent the second opening,
   wherein the second side wall is coupled to the first side wall and the base such that the apparatus comprises a polygon body of trigonal and tetrahedral facets.

2. An apparatus comprising:
   a semiconductor laser fixed to a board substrate so that the semiconductor laser emits light in a direction substantially perpendicular to the plane of the board substrate, through an opening in the board substrate;
   a base having a first opening of a dimension suitable to pass a light emission therethrough, fixedly attached to the board substrate so that the first opening aligns with the opening in the board substrate through which the semiconductor laser emits light;
   a first side wall coupled to the base and having a second opening of a dimension suitable to pass a light emission therethrough;
   a second side wall coupled to the base and having a planar reflective component thereon, and the base, the first side wall, and the second side wall define an interior chamber with the planar reflective component disposed in the interior chamber; and
   a fiber connector adapted to accept an LC connector extending from an exterior of the first side wall adjacent the second opening.

3. An apparatus comprising:
   a semiconductor laser fixed to a board substrate so that the semiconductor laser emits light in a direction substantially perpendicular to the plane of the board substrate, through an opening in the board substrate;
   a base having a first opening of a dimension suitable to pass a light emission therethrough, fixedly attached to the board substrate so that the first opening aligns with the opening in the board substrate through which the semiconductor laser emits light;
   a first side wall coupled to the base and having a second opening of a dimension suitable to pass a light emission therethrough;
   a second side wall coupled to the base and having a planar reflective component thereon, and the base, the first side wall, and the second side wall define an interior chamber with the planar reflective component disposed in the interior chamber; and
   a fiber connector extending from an exterior of the first side wall adjacent the second opening,
   wherein the first opening and the second opening are aligned through the reflective component to receive a light emission and the base has a third opening and the first side wall has a fourth opening, and the third and fourth opening are aligned to receive a light transmission.

4. A system comprising:
   an optical circuit substrate;
   at least one of a light receiving source and a light emitting source coupled to the optical circuit substrate and aligned so as to receive or emit light through an opening in the optical circuit substrate;
   an optical subassembly coupled to the optical circuit substrates and comprising an input, an output, and a reflective component, the input and reflective component disposed in a path of the at least one of the light receiving source and the light emitting source; and
   a fiber optic connector alignment guide that is adapted to be mated to an LC connector, the fiber optic connecter alignment guide coupled to the output of the optical subassembly.

5. A system comprising:
   an optical circuit substrate;
   at least one of a light receiving source and a light emitting source coupled to the optical circuit substrate and aligned so as to receive or emit light through an opening in the optical circuit substrate;
   an optical subassembly coupled to the optical circuit substrates and comprising an input, an output, and a reflective component, the input and reflective component disposed in a path of the at least one of the light receiving source and the light emitting source; and
   a fiber optic connector alignment guide coupled to the output of the optical subassembly,
   wherein the optical subassembly comprises a base having the input, a first side wall having the output, and a second side wall comprising the reflective component coupled to the first side wall and the base such that the optical subassembly comprises a polygon body of triangular and tetrahedral facets.

6. An apparatus comprising:
   a photodetector fixed to a board substrate so that the photodetector receives light from a direction substantially perpendicular to the plane of the board substrate, through an opening in the board substrate;
   a base having a first opening of a dimension suitable to pass a light emission therethrough, fixedly attached to the board substrate so that the first opening aligns with the opening in the board substrate through which the photodetector receives light;
   a first side wall coupled to the base and having a second opening of a dimension suitable to pass a light emission therethrough;
   a second side wall coupled to the base and having a planar reflective component thereon, and the base, the first side wall, and the second side wall define an interior chamber with the planar reflective component disposed in the interior chamber; and
   a fiber connector adapted to accept an LC connector extending from an exterior of the first side wall adjacent the second opening.

* * * * *

UNITED STATES PATENT AND TRADEMARK OFFICE
CERTIFICATE OF CORRECTION

| | |
|---|---|
| PATENT NO. | : 7,066,657 B2 |
| APPLICATION NO. | : 09/752881 |
| DATED | : June 27, 2006 |
| INVENTOR(S) | : Murali et al. |

It is certified that error appears in the above-identified patent and that said Letters Patent is hereby corrected as shown below:

In column 4, at line 2, delete "compliment" and insert --complement--.

Signed and Sealed this

Eighth Day of April, 2008

JON W. DUDAS
*Director of the United States Patent and Trademark Office*